United States Patent [19]

Iwata

[11] Patent Number: 5,038,822
[45] Date of Patent: Aug. 13, 1991

[54] FLOW RATE CONTROL VALVING APPARATUS

[75] Inventor: Hiroto Iwata, Saitama, Japan
[73] Assignee: Jidosha Kiki, Co., Ltd., Tokyo, Japan
[21] Appl. No.: 669,807
[22] Filed: Mar. 15, 1991

[30] Foreign Application Priority Data

Mar. 29, 1990 [JP] Japan .............................. 2-31918[U]

[51] Int. Cl.⁵ ............................................. G05D 7/01
[52] U.S. Cl. ..................................... 137/503; 137/117
[58] Field of Search ................ 137/503, 502, 500, 117

[56] References Cited

U.S. PATENT DOCUMENTS

| | | | |
|---|---|---|---|
| 2,703,631 | 3/1955 | Hupp | 137/503 X |
| 3,314,495 | 4/1967 | Clark et al. | |
| 3,726,302 | 4/1973 | Lawsing | 137/117 |
| 4,546,786 | 10/1985 | Hoike | 137/117 |

FOREIGN PATENT DOCUMENTS 45-7125  3/1970  Japan .

Primary Examiner—Alan Cohan
Attorney, Agent, or Firm—Townsend & Townsend

[57] ABSTRACT

A flow rate control valving apparatus includes a housing, a plug connector, and a tubular member. The housing has a valve bore in which a spool is movably housed. The plug connector is provided opposite to one end portion of the spool to form a high-pressure chamber for receiving a pressurized fluid from a pump between the spool and the plug connector. A small-diameter opening is formed in a portion of the plug connector opposite to the high-pressure chamber, and a supply passage connected to the small-diameter opening is formed in the plug connector to supply the pressurized fluid to a fluid system. The tubular member is fixed at a position in the supply passage in the plug connector, at which the tubular member engages with the distal end of an adjusting rod portion of the spool to regulate the movement of the spool toward the high-pressure chamber, and serves as a stopper for regulating the movement of the spool. A small hole portion communicating with the supply passage is formed in the tubular member, and an internal passage of the tubular member communicates with the small hole portion and the pressure guide passage extending to the other end portion of the spool.

6 Claims, 3 Drawing Sheets

FLOW RATE CONTROL VALVING APPARATUS

BACKGROUND OF THE INVENTION

The present invention relates to an improvement in a flow rate control valving apparatus suitably used in a vehicular power steering system and the like.

Since an oil pump which serves as a hydraulic pressure generating source in, e.g., a hydraulic power steering system is driven by an engine of a vehicle, a discharge amount of a pressurized oil from the pump is increased/decreased in proportion to the engine speed. Therefore, such a pump is required to have a capacity capable of providing a sufficient flow rate not interfering with an operation of the power steering system as a fluid system even when a pump discharge amount is small. However, a pump having this capacity provides an unnecessarily high flow rate in a high speed range of an engine to pose various problems in individual parts. In conventional systems, therefore, a flow rate control valving apparatus for controlling a supply flow rate to be constant is generally disposed in an oil pressure passage between the pump and the power steering as a fluid system to return an unnecessary pressurized oil to the tank.

As a flow rate control valving apparatus of this type, an apparatus having an arrangement as shown in FIG. 4 is conventionally known. This apparatus will be briefly described below. A flow rate control valving apparatus generally denoted by reference numeral 1 comprises a valve housing 2 formed or provided integrally with a pump body, a valve bore 3 having an end open in a portion of the housing 2, a pressurized oil supply passage 4 and a pressurized oil return passage 5, open in a central portion in the axial direction of the valve bore 3 with a predetermined interval therebetween, for supplying a pressurized oil from a pump P and returning the oil to a tank T, respectively, a valve spool 6, slidably held in the valve bore 3, for selectively communicating or closing the two passages 4 and 5, a set spring 7 for biasing the spool 6 toward the open end side of the valve bore 3 to normally close the passages 4 and 5, and a plug connector 9 threadably engaged with the open end of the valve bore 3 and internally having a pressurized oil supply passage 8 for communicating with the oil pressure supply passage 4 from the pump to supply the pressurized oil to a power steering PS. A small-diameter opening 10 is formed in the connector 9 at a portion close to the pressurized oil supply passage 4, and an adjusting rod portion 11 extending through the small-diameter opening 10 and having a large-diameter head portion at its distal end is integrally provided coaxially with the spool 6, thereby constituting a metering orifice 12 for moving the spool 6 against the biasing force of the spring 7 in accordance with a pressurized oil supply flow rate from the pump P to selectively allow the passage 4 to communicate with the passage 5 to the tank T. That is, the pressure on the downstream side of the orifice 12 is supplied to a low-pressure chamber 15, formed at the end portion on the spring 7 side of the spool 6, by a passage bore 13a formed in the radial direction of the connector 9 and a passage bore 14 formed in the valve housing 2 through an annular recess 13b connected to the passage bore 13a.

The pressure on the upstream side of the orifice 12, on the other hand, is supplied from the supply passage 4 to a high-pressure chamber 16 formed between the end face from which the adjusting rod portion 11 of the spool 6 projects in the valve bore 3 and the small-diameter opening 10 for forming the orifice 12. As a result, the spool 6 is moved in either direction by a differential pressure generated before or after the orifice 12 in accordance with the supply flow rate of the pressurized oil to adjust an amount to be returned to the tank T, so that the supply flow rate to the supply passage 8 is maintained constant.

Reference numeral 17 denotes a stopper cylinder, projecting from the inner end of the connector 9 to form the high-pressure chamber 16, for regulating a moving amount of the spool 6 toward the high pressure side by stopping it at a predetermined position. Note that reference numeral 17a denotes a bore portion for guiding the pressurized oil into the stopper cylinder 17; and 6a, an annular recess formed adjacent to a land portion 6b of the spool 6 for closing the passages 4 and 5 and connected to the return passage 5. Other arrangements or operations including these parts except for those described above are conventionally known and a detailed description thereof will be omitted.

In the above flow rate control valving apparatus, since the metering orifice 12 must be provided in the pressurized oil supply passage in order to move the spool 6 to execute flow rate control, a pressure loss derived from the presence of the orifice 12 cannot be avoided. That is, assuming that the sectional area of the spool 6 is A, the pressures before and after the metering orifice 12 are $P_1$ and $P_2$, respectively, a spring constant is k, a deflection amount of the spring 7 is x, and a deflection amount upon setting is δ, the following equation is given:

$$P_1 A = P_2 A + k(x + \delta)$$

Therefore, a pressure difference represented by the following equation is necessary to move the spool 6:

$$P_1 - P_2 = k/A \cdot (x + \delta)$$

Since the individual parts such as the passages of the orifice 12 must be designed in accordance with the above conditions, generation of the pressure loss cannot be avoided.

In recent years, however, a strong demand has arisen for energy saving, and a valve arrangement capable of minimizing the pressure loss caused by the metering orifice 12 described above has been desired accordingly.

In addition, a flow rate control valving apparatus of this type is required to realize a simple arrangement, a light weight, and a low manufacturing cost, and a certain countermeasure allowing easy processing of the individual parts is also necessary. Therefore, these conditions must be taken into consideration.

SUMMARY OF THE INVENTION

It is, therefore, an object of the present invention to provide a flow rate control valving apparatus in which an arrangement of the entire apparatus is simplified and processability of the individual parts is improved and which can be manufactured at lost.

It is another object of the present invention to provide a flow rate control valving apparatus which can suppress a pressure drop width in a metering orifice required to operate a spool for performing flow rate control with a pressure difference, compared to conventional apparatuses, thereby reducing a pressure loss in a pressure fluid supply system.

In order to achieve the above objects of the present invention, there is provided a flow rate control valving apparatus comprising a housing having a valve bore in which a spool is movably housed, a plug connector provided opposite to one end portion of the spool to form a high-pressure chamber for receiving a pressurized fluid from a pump between the spool and the plug connector, a small-diameter opening being formed in a portion of the plug connector opposite to the high-pressure chamber and a supply passage connected to the small-diameter opening being formed in the plug connector to supply the pressurized fluid to a fluid system, the spool having an adjusting rod portion extending from the one end portion to the supply passage in the plug connector through the small-diameter opening, a metering orifice being formed between the small-diameter opening and the adjusting rod, and a pressure guide passage being formed to guide a pressure on a downstream side of the metering orifice to a low-pressure chamber having a pressure lower than that in the orifice and formed at the other end portion of the spool, and a tubular member, fixed at a position in the supply passage in the plug connector, at which the tubular member engages with the distal end of the adjusting rod portion of the spool to regulate the movement of the spool toward the high-pressure chamber, for serving as a stopper for regulating the movement of the spool, wherein a small hole portion communicating with the supply passage is formed in the tubular member, and an internal passage of the tubular member communicates with the small hole portion and the pressure guide passage extending to the other end portion of the spool.

According to the present invention, the tubular member inserted and fixed in the radial direction of the plug connector is used as stopper means for positioning the spool to regulate its movement, and the pressure in the internal passage communicating with the tubular member through the small hole portion is reduced by the pressurized fluid flowing through the tubular member, thereby supplying a pressure with a pressure drop width larger than those obtained by conventional apparatuses to the low-pressure chamber at the other end portion of the spool. Therefore, since the pressure drop width in the metering orifice can be suppressed compared to the conventional apparatuses, a pressure loss in the pressurized fluid supply system can be reduced.

DETAILED DESCRIPTION OF THE PREFERRED EMBODIMENT

An embodiment of the present invention will be described in detail below with reference to the accompanying drawings.

Figure 1:
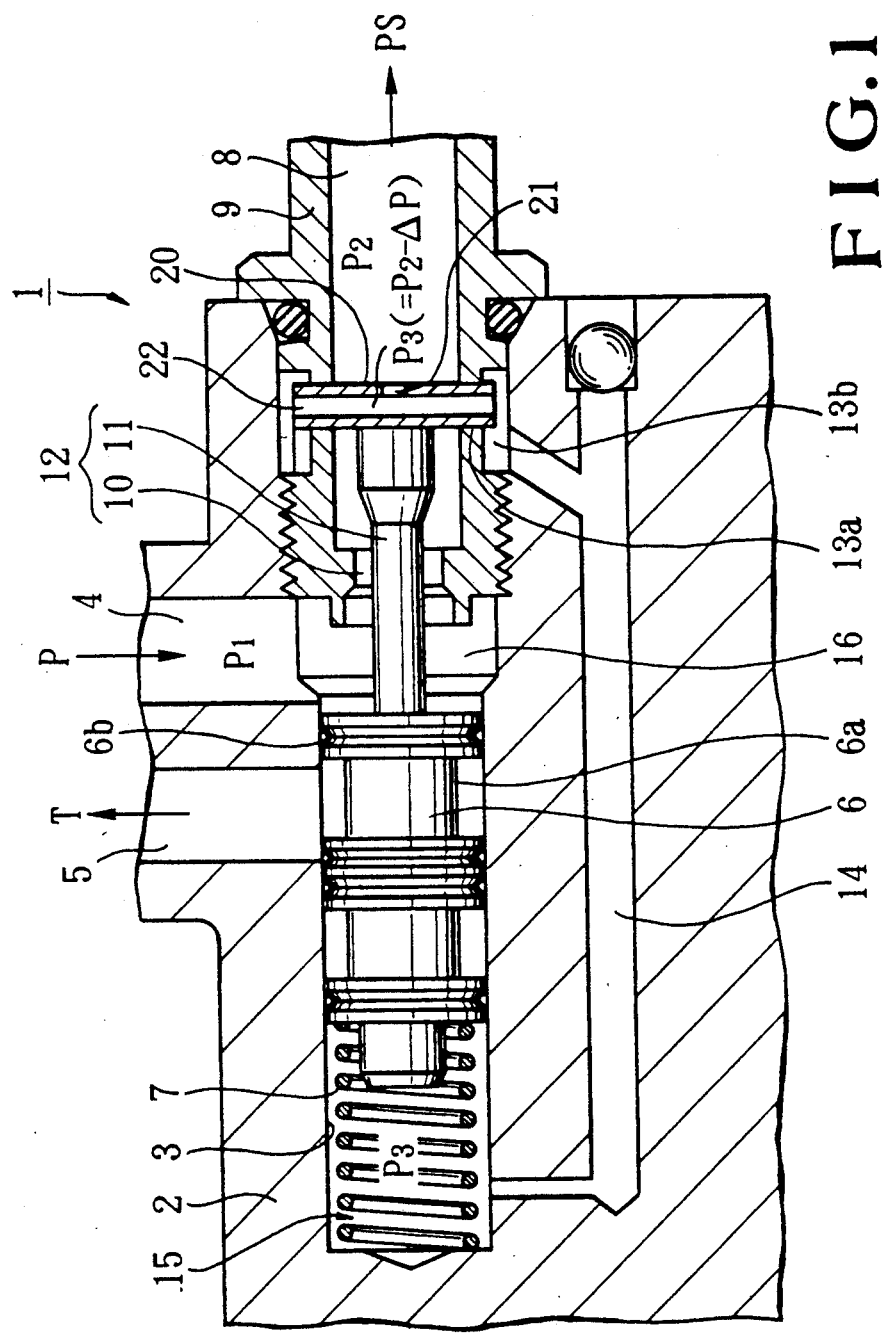
FIG. 1 is a schematic sectional view showing an embodiment of a flow rate control valving apparatus according to the present invention.
Figure 2:
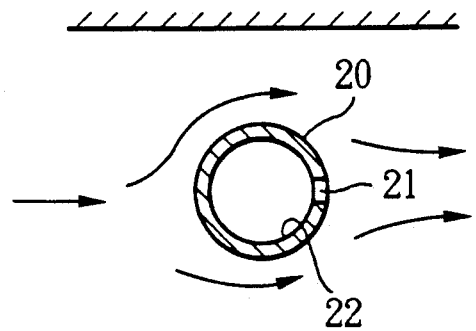
FIG. 2 is a view for explaining the flow of a pressurized flow around a tubular member provided in a plug connector as a characteristic feature of the present invention.
Figure 4:
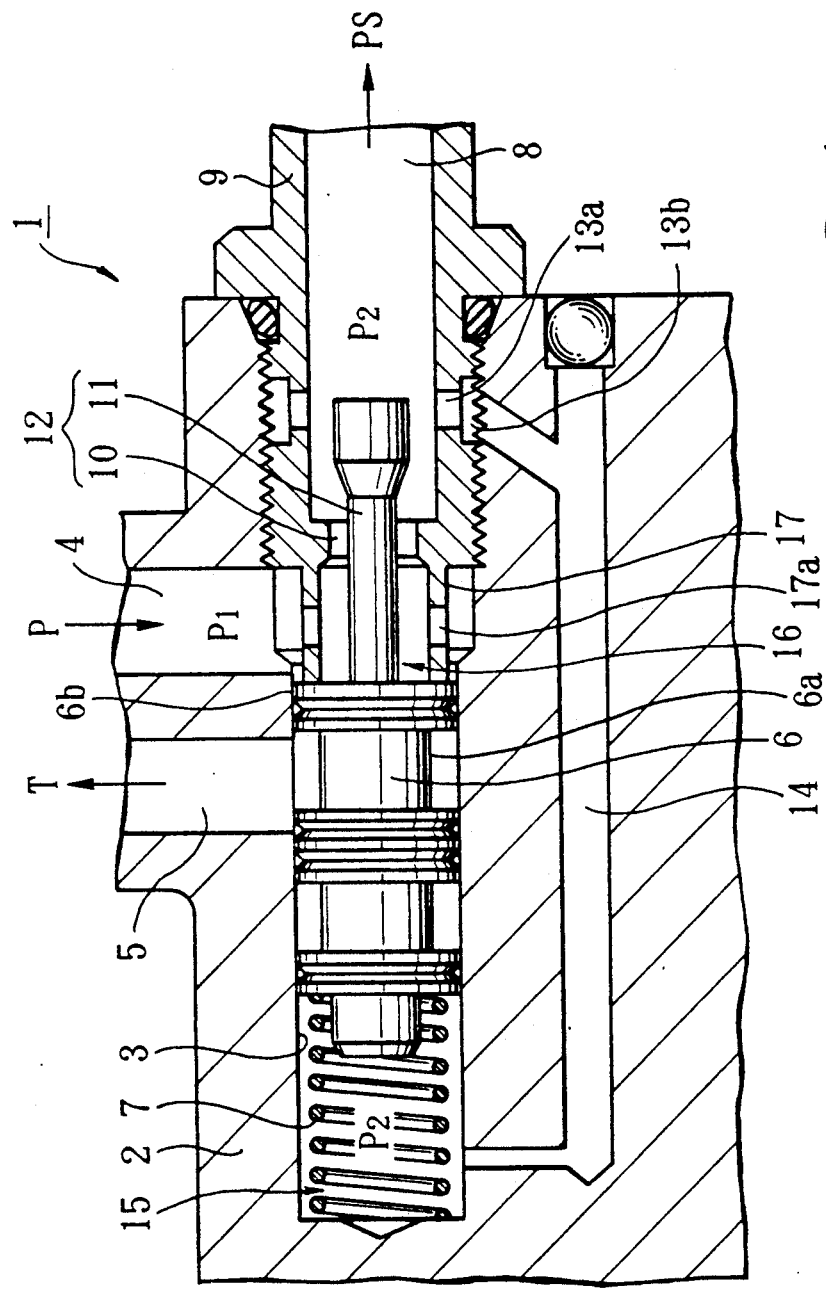
FIG. 4 is a schematic sectional view showing a conventional apparatus.

FIGS. 1 and 2 show an embodiment of a flow rate control valving apparatus according to the present invention. In FIGS. 1 and 2, the reference numerals as in FIG. 4 denote the same parts and a detailed description thereof will be omitted.

According to the present invention, a plug connector 9 has a small-diameter opening 10 for forming a high-pressure chamber for receiving a pressurized oil at one end portion of a spool 6 in a valve bore 3 and a supply passage 8 connected to the small-diameter opening 10 to supply the pressurized oil to a power steering PS, and is provided at an opening end of the valve bore 3. In the plug connector 9, a tubular member 20 constituted by a pipe member having a small hole 21 communicating with the supply passage 8 is inserted in the radial direction of the connector and fixed at a position facing the supply passage 8, at which the tubular member 20 can engage with the distal end portion of an adjusting rod portion 11 extending from the end portion of the spool 6 through the small-diameter opening 10 to regulate the movement of the spool 6 toward a high-pressure chamber 16. An internal passage 22 of the tubular member 20 is connected to a portion of an annular recess 13b serving as a pressure guide passage for guiding the pressure on the downstream side of a metering orifice 12 constituted by the small-diameter opening 10 and the adjusting rod portion 11 to a low-pressure chamber 15 at the other end portion of the spool 6.

With this arrangement, in place of a conventional stopper cylinder projecting from the inner end of the plug connector 9 to regulate the movement of the spool 6, the tubular member 20 inserted and fixed in the radial direction of the plug connector 9 is used as stopper means for positioning the spool 6 to regulate its movement. Therefore, the arrangement is simplified, and the positioning executed by the tubular member 20 can be set at an arbitrary position. In addition, the apparatus of the present invention is superior in processability of the individual parts to conventional apparatuses and can achieve a light weight and a low manufacturing cost.

Furthermore, according to the present invention, the pressure in the internal passage 22 communicating with the tubular member 20 through the small hole 21 can be reduced by a spraying effect caused by the flow of a pressurized oil flowing through the tubular member 20 or a peeling phenomenon of a streamline derived from a column. Therefore, since a pressure having a pressure drop width larger than those obtained by conventional apparatuses can be supplied to the low-pressure chamber 15 at the other end of the spool 6, the pressure drop width in the metering orifice 12 can be suppressed as compared with conventional apparatuses. As a result, the pressure loss in the pressurized fluid supply system can be reduced. That is, although the pressure in the supply passage 8 in which the pressure is reduced by the metering orifice 12 is $P_2$, since the tubular member 20 having the small hole 21 is used, the pressure in the internal passage 22 is given by:

$$P_3 = P_2 - \Delta P$$

where $\Delta P$ is the pressure drop caused by the spraying effect or the streamline peeling phenomenon derived from a column described above.

Since the dropped pressure $P_3$ is supplied to the low-pressure chamber 15 to move the spool 6, the spool 6 can move farther by an amount of $\Delta P \cdot A/k$ than in conventional apparatuses if the pressure drop caused by the metering orifice 12 is the same. In other words, the pressure drop in the metering orifice 12 can be reduced and therefore the pressure loss can be reduced as compared with those in conventional apparatuses if the pressurized oil is supplied at the same flow rate to the power steering PS. Therefore, energy saving can be achieved, and oil temperature rise, degradation in rubber or the like caused by heat of the pump, or abrasion in slidable parts can be prevented to improve reliability.

Figure 3A:
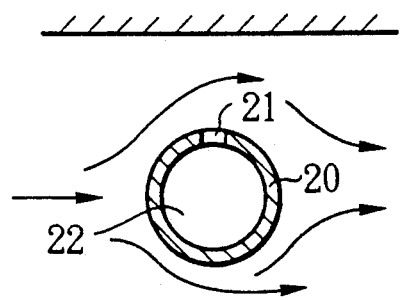
FIGS. 3A, 3B and 3C are views showing modifications of the tubular member shown in FIG. 2.
Figure 3B:
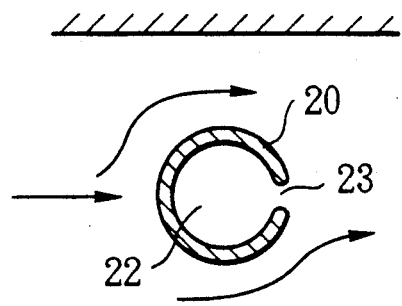
Figure 3C:
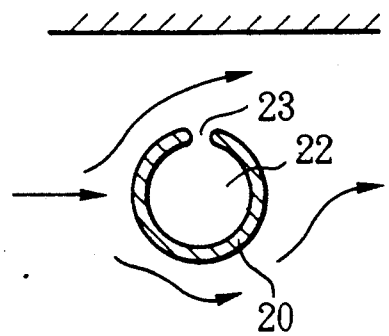

In the above embodiment, as shown in FIG. 2, the small hole 21 is formed in a central portion on the side of the tubular member 20 opposite to the flow. However, the present invention is not limited to the above embodiment. For example, as shown in FIG. 3A, a small hole may be formed in a direction perpendicular to the flow. That is, the direction of the small hole 21 with respect to the flow may be arbitrarily set in accordance with various conditions. In addition, in the above embodiment, the tubular member 20 is constituted by a pipe member, and the small hole is formed in a portion of the tubular member 20. However, as shown in FIG. 3B or 3C, a tubular member 20 constituted by a spring pin may be used to use its slit 23 formed in an arbitrary direction as a small hole portion. That is, the small hole 21 or the slit 23 need only be formed such that the pressure in the internal passage 22 is reduced by an influence of a fluid flowing around the tubular member 20 in the presence of these small hole portions.

The present invention is not limited to the structure of the above embodiment, but the shape and structure of each part of the flow rate control valving apparatus 1 can be arbitrarily modified and changed to achieve various modifications. In addition, the flow rate control valving apparatus 1 according to the present invention can be applied to not only the power steering as described above but also various types of fluid systems using various pressurized fluids to achieve the same effects.

As has been described above, the flow rate control valving apparatus according to the present invention comprises the plug connector, which has the small-diameter opening for forming the high-pressure chamber for receiving a pressurized fluid at one end portion of the spool in the valve bore and a supply passage connected to the small-diameter opening to supply the pressurized fluid to a fluid system, and which is provided in the opening end of the valve bore. The tubular member having the small hole portion communicating with the supply passage is inserted in the radial direction of the connector and fixed at a position facing the supply passage, at which the tubular member engages with the distal end of the adjusting rod portion extending from the end portion of the spool through the small-diameter opening to regulate the movement of the spool toward the high-pressure chamber. The internal passage of the tubular member is connected to a portion of the pressure guide passage for guiding the pressure on the downstream side of the metering orifice constituted by the small-diameter opening and the adjusting rod portion to the low-pressure chamber at the other end portion of the spool. Therefore, regardless of this simple arrangement, the tubular member inserted and fixed in the radial direction of the connector can be used as stopper means for positioning the spool to regulate its movement. Since constituting parts having a problem in processability such as a stopper cylinder used at the inner end of the connector in conventional apparatuses can be omitted, the arrangement can be simplified and the weight and manufacturing cost of the entire apparatus can be reduced. In addition, according to the present invention, since the pressure in the internal passage communicating with the tubular member through the small hole portion can be reduced by the pressurized fluid flowing through the tubular member, a pressure having a pressure drop width larger than that obtained in conventional apparatuses can be supplied to the low-pressure chamber at the other end of the spool. Therefore, the pressure drop width in the metering orifice can be suppressed as compared with conventional apparatuses, and the pressure loss in the pressurized fluid supply system can be reduced. That is, various excellent practical effects can be obtained by the present invention.

What is claimed is:

1. A flow rate control valving apparatus comprising:
   a housing having a valve bore in which a spool is movably housed;
   a plug connector provided opposite to one end portion of said spool to form a high-pressure chamber for receiving a pressurized fluid from a pump between said spool and said plug connector, a small-diameter opening being formed in a portion of said plug connector opposite to said high-pressure chamber and a supply passage connected to said small-diameter opening being formed in said plug connector to supply the pressurized fluid to a fluid system,
   said spool having an adjusting rod portion extending from said one end portion to said supply passage in said plug connector through said small-diameter opening,
   a metering orifice being formed between said small-diameter opening and said adjusting rod, and
   a pressure guide passage being formed to guide a pressure on a downstream side of said metering orifice to a low-pressure chamber having a pressure lower than that in said orifice and formed at the other end portion of said spool; and
   a tubular member, fixed at a position in said supply passage in said plug connector, at which said tubular member engages with the distal end of said adjusting rod portion of said spool to regulate the movement of said spool toward said high-pressure chamber, for serving as a stopper for regulating the movement of said spool,
   wherein a small hole portion communicating with said supply passage is formed in said tubular member, and an internal passage of said tubular member communicates with said small hole portion and said pressure guide passage extending to the other end portion of said spool.

2. An apparatus according to claim 1, wherein said spool is biased by a spring toward said high-pressure chamber.

3. An apparatus according to claim 1, wherein said tubular member is formed by bending a plate member into a cylinder, and a slit formed upon formation of said cylinder is used as said small hole portion.

4. An apparatus according to claim 1, wherein said tubular member is formed adjacent to a passage bore for allowing said internal passage to communicate with said pressure guide passage.

5. An apparatus according to claim 4, wherein said passage bore is constituted by two bores formed opposite to each other.

6. An apparatus according to claim 5, wherein a passage for allowing said two bores of said passage bore to communicate with each other is formed in an outer circumferential surface of said plug connector.

* * * * *